United States Patent [19]

Smith

[11] Patent Number: 4,870,926
[45] Date of Patent: Oct. 3, 1989

[54] INSECTICIDE APPLICATOR FOR ANIMALS

[76] Inventor: A. E. Smith, R.R. 3, Smith Center, Kans. 66967

[21] Appl. No.: 163,866

[22] Filed: Mar. 3, 1988

[51] Int. Cl.$^4$ .............................................. A01K 29/00
[52] U.S. Cl. .................................................. 119/157
[58] Field of Search ........................ 119/156, 157, 159

[56] References Cited

U.S. PATENT DOCUMENTS

| | | | |
|---|---|---|---|
| 1,269,352 | 6/1918 | Whaley | 119/157 |
| 1,300,297 | 4/1919 | Randall | 119/157 |
| 2,988,050 | 6/1961 | Minock | 119/159 |
| 2,991,756 | 7/1961 | Thaete | 119/159 |
| 3,913,530 | 10/1975 | Smith | 119/159 |
| 3,958,537 | 5/1976 | Sittner | 119/157 |

Primary Examiner—Gene Mancene
Assistant Examiner—R. Thomas Price
Attorney, Agent, or Firm—Zarley, McKee, Thomte, Voorhees & Sease

[57] ABSTRACT

An insecticide applicator for animals is described which is comprised of an elongated hollow tube which is filled with insecticide dust at the factory. A closure element seals the end of the tube and also provides a mounting structure to enable the tube to be secured to a suitable mount. The tube is provided with a plurality of spaced-apart ball-like protrusions which extend downwardly from the bottom thereof and which are removed at the point of use to enable valve members to be inserted into the openings created by the removal of the protrusions. When all of the valve members have been installed, the tube is rotated 180° and is positioned in its supporting mount. When an animal rubs against the tube, the valve members move upwardly in their respective valve openings so that the insecticide dust flows downwardly from the interior of the tube onto the animal.

6 Claims, 4 Drawing Sheets

INSECTICIDE APPLICATOR FOR ANIMALS

BACKGROUND OF THE INVENTION

It has long been recognized that it is advantageous to protect animals from insect pests and parasites. Perhaps the first method of protecting the animals was to manually spray insecticide on the animals. A later method of controlling the insects was to hang oily burlap sacks or the like from some sort of support so that the animals could rub against the same. A later apparatus for controlling the insects was the so-called "cattle oiler" against which the cattle could rub with the rubbing action transferring the oil and/or liquid insecticide onto the hair and coats of the animals.

In an attempt to eliminate some of the problems associated with the prior art devices, applicant devised an insecticide applicator which was the subject of U.S. Pat. No. 3,913,530. In the applicator of the '530 patent, a flexible tube is supported between a pair of supports with a bag of insecticide dust being supported adjacent one end of the tube with the contents of the bag being in communication with the interior of the tube. When the dust bag becomes empty, a replacement bag is substituted therefor. Although the applicator of the '530 patent has met with considerable success, it has been found that the shipment of the dust bags poses a problem. A further problem associated with the applicator of the '530 patent is in the procedure for replacing the dust bag. Yet another problem of the '530 device is the cost of the support stand for the dust applicator.

SUMMARY OF THE INVENTION

In the instant invention, a disposable, sealed dust tube having the insecticide dust contained therein is shipped from the factory and is ultimately delivered to the end user in the sealed condition. The dust tube is provided with a plurality of ball-like protrusions extending from the bottom thereof which are removed by the end user with dust valves being positioned in the openings created by the removal of the protrusion. The dust tube is then suitably mounted on a support so that the dust valves are positioned at the lower end or bottom of the tube. Engagement of the animals with the dust valves causes the insecticide dust to be deposited on the hair of the animal. An elongated channel is also provided along the bottom of the tube to permit the dust to freely flow from one end thereof to the other.

It is therefore a principal object of the invention to provide an improved insecticide applicator for animals.

A further object of the invention is to provide an insecticide applicator which may be shipped from the factory in a sealed condition with the dust contained therein.

Yet another object of the invention is to provide an insecticide applicator for animals which may be regarded as being disposable.

Still another object of the invention is to provide an insecticide applicator for animals including means for conveniently installing dust valves therein when the device is being prepared for use.

Still another object of the invention is to provide an insecticide applicator for animals which does not require an elaborate supporting stand.

These and other objects will be apparent to those skilled in the art.

DESCRIPTION OF THE PREFERRED EMBODIMENT

Figure 1:
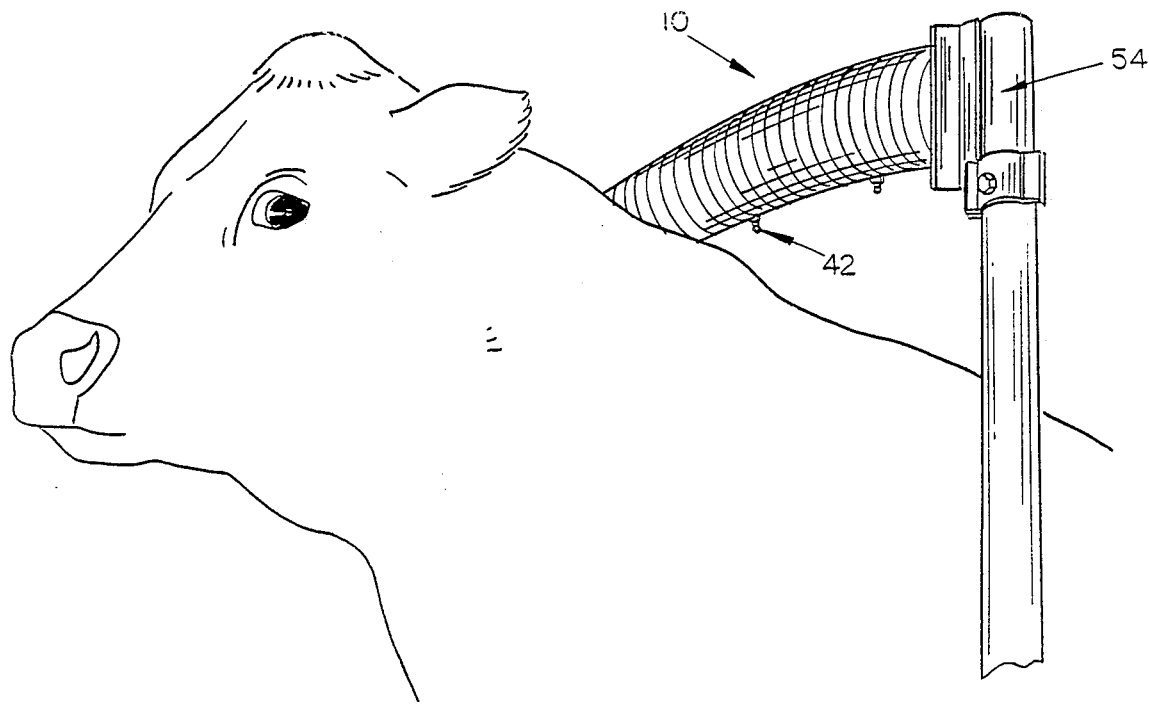
FIG. 1 is a perspective view illustrating the applicator of this invention mounted on a stand with an animal shown rubbing there against.
Figure 2:
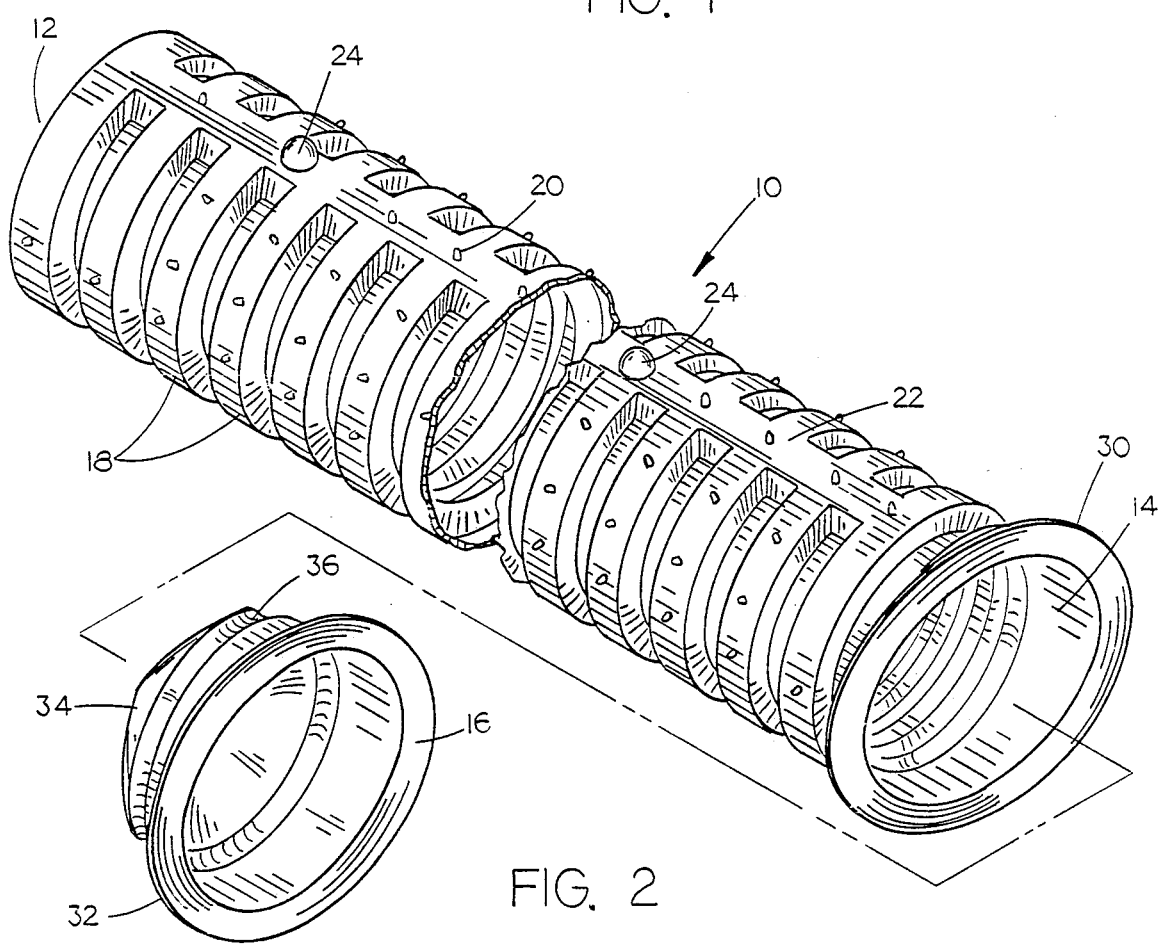
FIG. 2 is an exploded perspective view of the applicator of this invention with portions thereof cut away to more fully illustrate the invention.

The applicator or dust tube of this invention is referred to generally by the reference numeral 10. Tube 10 is comprised of an elongated plastic material and includes a sealed outer end 12, initially open inner end 14 and closure 16 which is pressure-fit into open end 14 after dust has been positioned in the tube 10 as will be described hereinafter. Tube 10 is provided with a plurality of annular ring-like members 18 having transverse annular troughs formed on the interior thereof and having a plurality of protrusions 20 extending therefrom as seen in the drawings. Tube 10 is also provided with an elongated channel 22 which extends between the ends thereof and which communicates with the trough of the annular members 18 for a purpose to be described hereinafter. Preferably, tube 10 is provided with a plurality of ball-like protrusions 24 extending downwardly from the tube as illustrated in the drawings.

Figure 3:
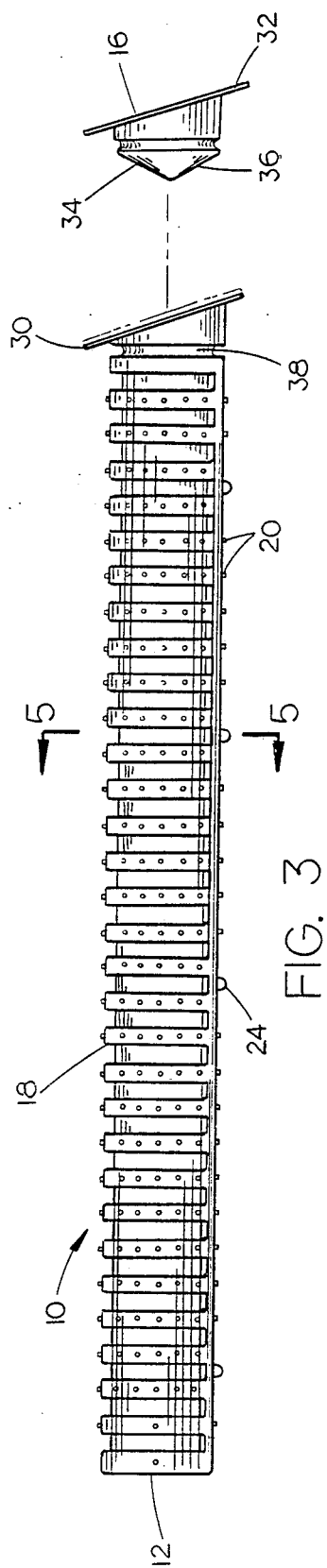
FIG. 3 is a side view of the applicator of this invention with the end cap being shown in its removed condition.
Figure 5:
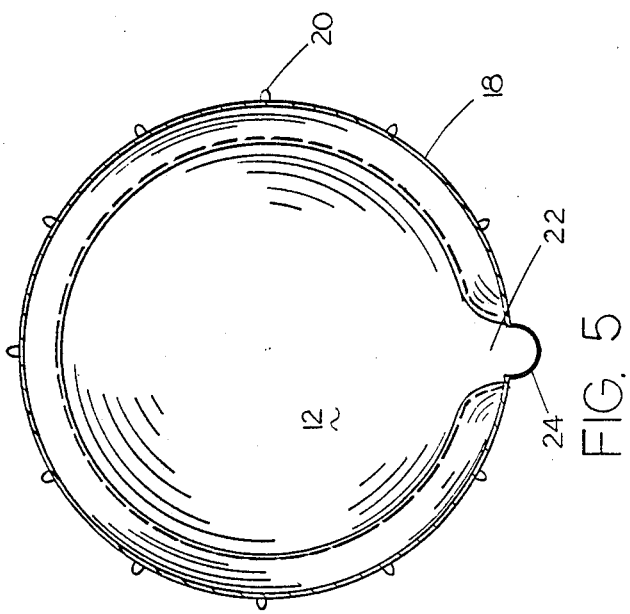
FIG. 5 is an enlarged sectional view seen on lines 5—5 of FIG. 3.
Figure 4:
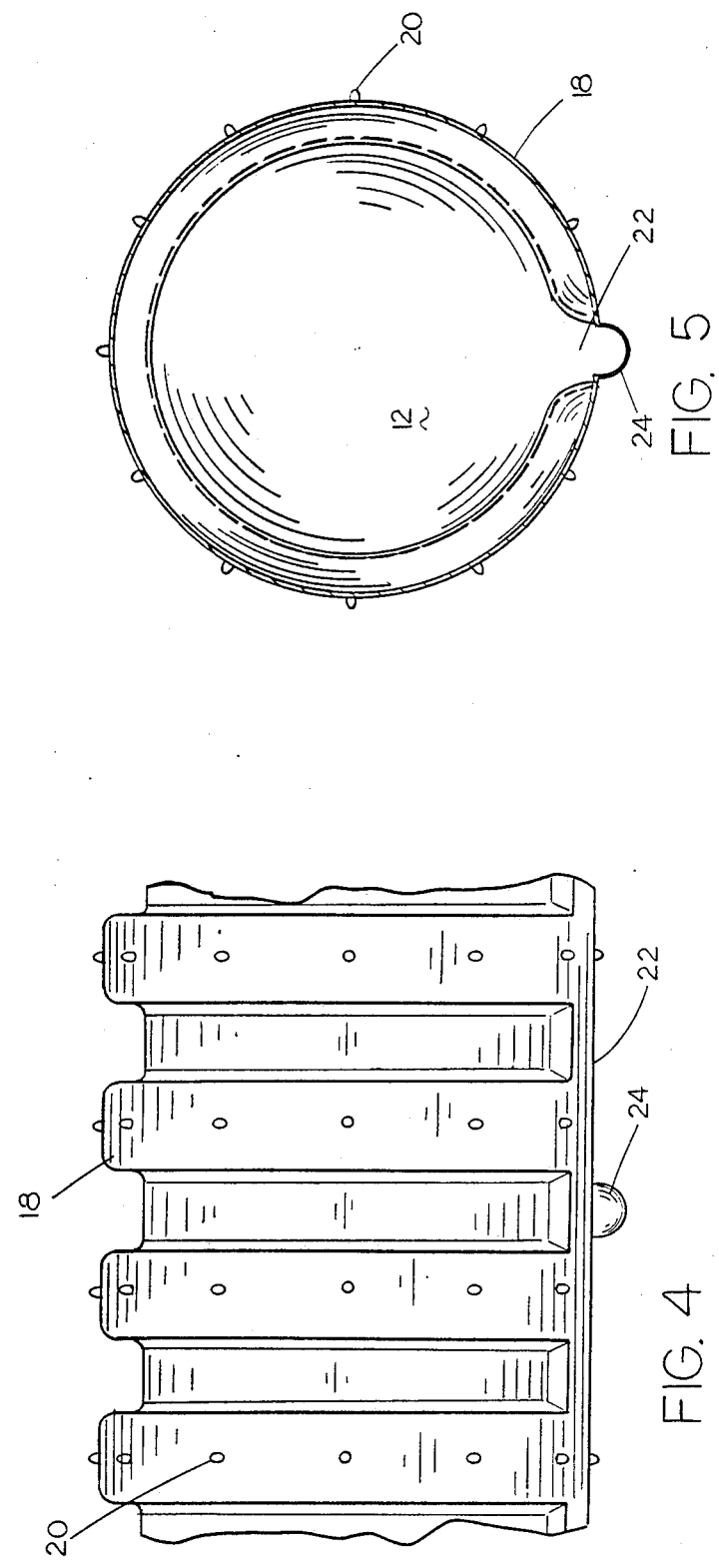
FIG. 4 is a partial side view of the applicator.

The tube 10 is filled with insecticide dust at the factory with the dust being introduced into the interior 28 of the tube 10 through the open end 14. When the tube 10 has been filled, closure 16 is press-fit into the end of the tube with approximately 1500 pounds pressure. As seen in FIG. 3, the inner end of the tube 10 is provided with an annular flange 30 which is disposed at an angle with respect to the longitudinal axis of the tube 10. As also seen in FIG. 3, closure 16 is also provided with an annular flange 32 which is inclined with respect to the longitudinal axis thereof so that when closure 16 is mounted in the end of the tube 10, the flanges 30 and 16 will be positioned adjacent one another. Closure 16 includes a plug portion 34 having an annular groove 36 provided therein which is adapted to be received by the inner surface of the shoulder 38.

Figure 6:
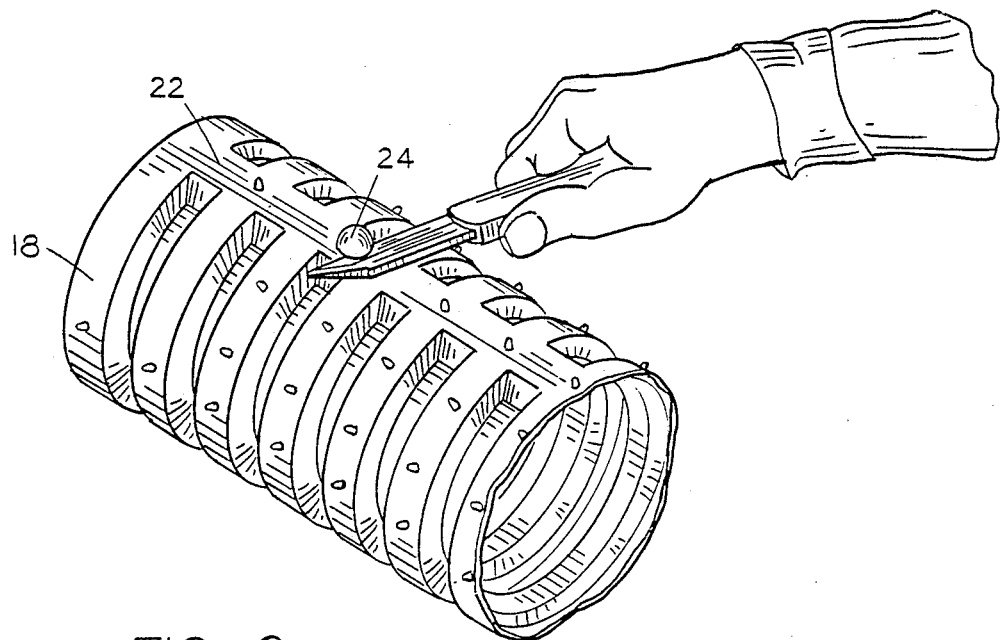
FIG. 6 is a partial perspective view illustrating the manner in which the ball-like protrusions are removed from the tube to facilitate the insertion of a dust valve in the tube.
Figure 7:
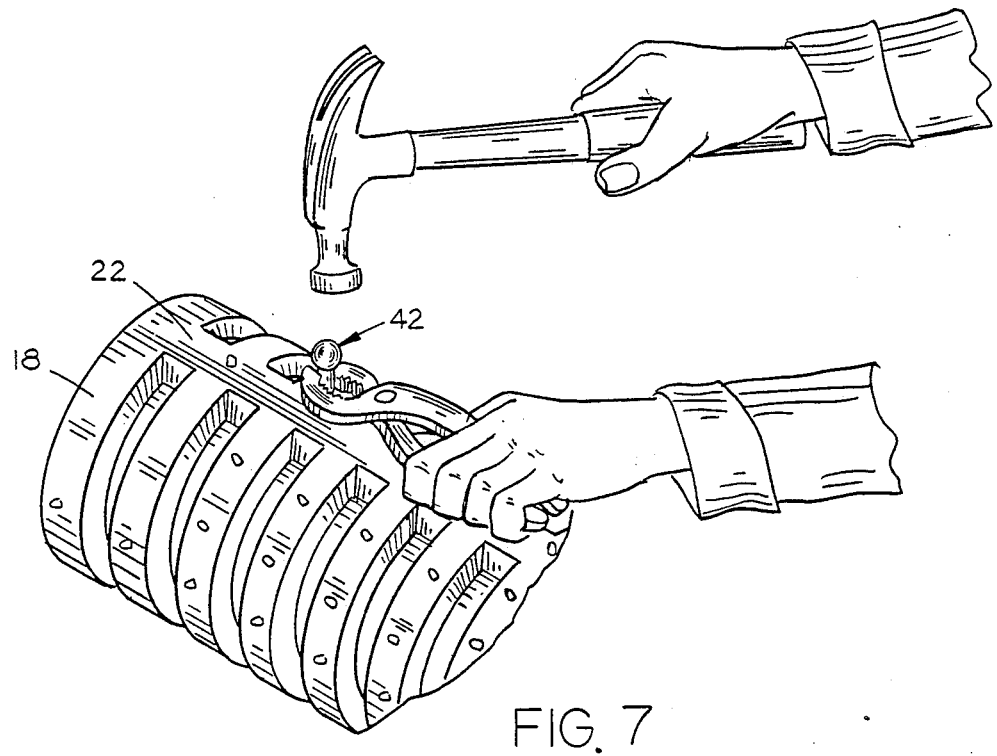
FIG. 7 is a perspective view illustrating a dust valve being installed in the applicator.
Figure 10:
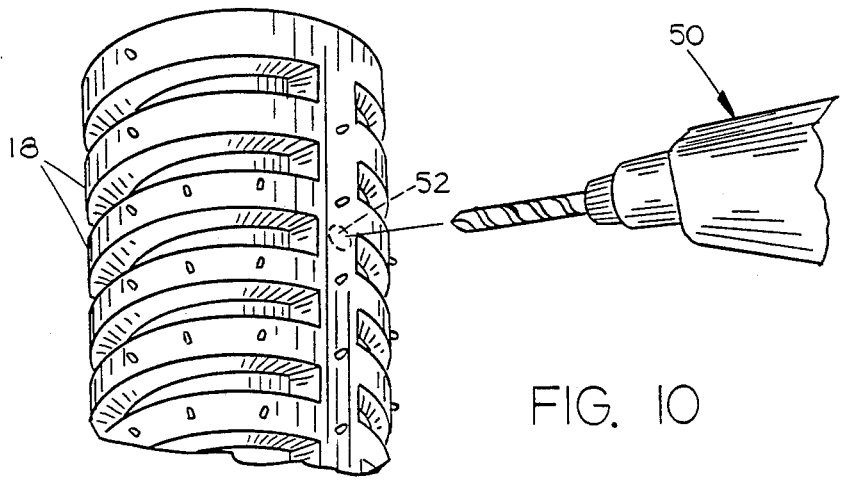
FIG. 10 is a perspective view illustrating a different method of creating an opening for installation of the dust valve.

Thus, the tube 10 and the dust contained therein is shipped from the factory and is delivered to the end user in its sealed condition. When it is desired to use or mount the tube 10, the tube 10 is placed in a horizontal condition with the protrusions 24 being positioned on the upper portion of the tube as illustrated in FIG. 6. A sharp knife or hacksaw is then used to remove the ball-like protrusions 24 to create an opening 40 in the tube 10. A dumbbell shaped dust valve 42 comprising ball portions 44 and 46 connected by a shank portion 48 is installed in the opening 40 in the manner illustrated in FIG. 7. The valve 42 is gripped by a pair of pliers as illustrated in FIG. 7 and the ball portion 44 is driven through the opening 40 by means of a hammer or the like as seen in FIG. 7. The same procedure is repeated for all of the ball-like protrusions. Although the utilization of the ball-like protrusions 24 is the preferred embodiment, the protrusions 24 may be omitted with an electric drill 50 being utilized to drill holes or valve openings 52 in the tube as illustrated in FIG. 10. Valve 42 is then positioned in the opening 52 in a manner identical to that illustrated in FIG. 7.

Figure 8:
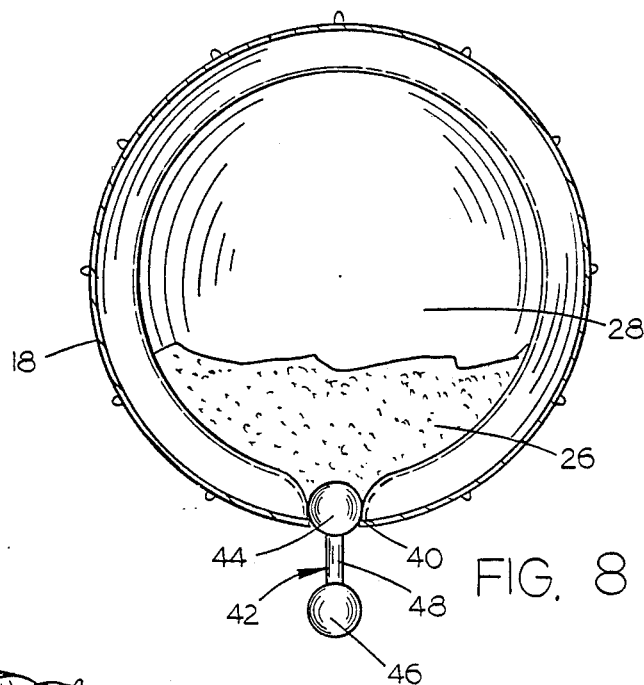
FIG. 8 is a sectional view illustrating the dust valve in position in the applicator.
Figure 9:
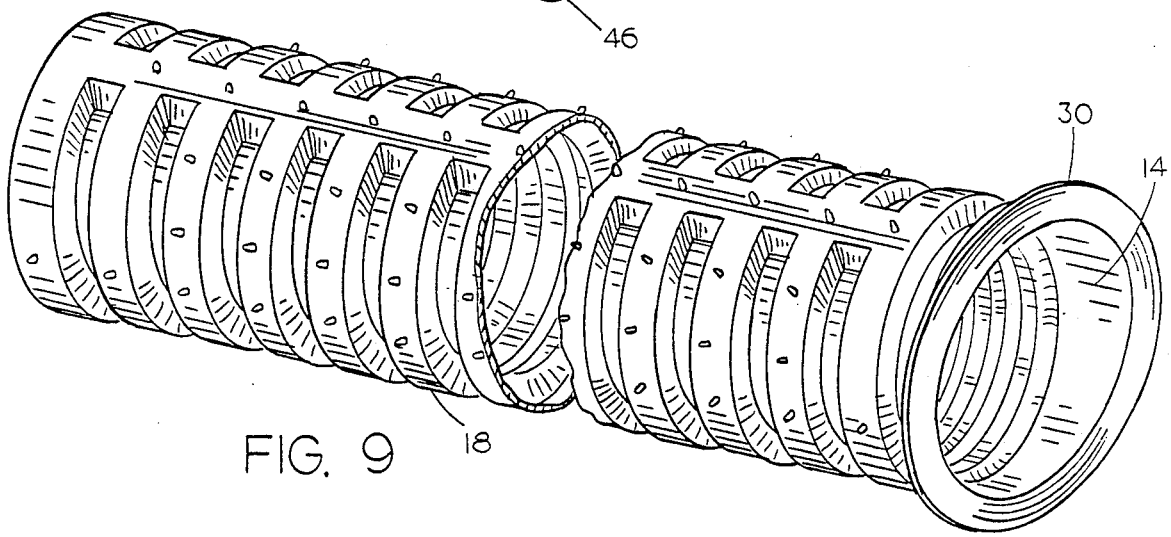
FIG. 9 is a perspective view similar to FIG. 2 except that the applicator has been rotated 180°.

When all of the valves 42 have been installed in their respective openings, the tube 10 is rotated 180° so that the valves 42 are positioned at the bottom of the tube as illustrated in FIG. 8. The tube 10 is then mounted in a suitable support referred to generally by the reference numeral 54 in FIG. 1 so that the tube 10 extends generally horizontally therefrom. The spaced-apart annular members 18 not only provide a surface from which the protrusions 20 may extend but also adds strength to the tube itself. When an animal rubs against the tube 10 as illustrated in FIG. 1, the valves 42 will be moved upwardly in their respective openings so that dust may pass downwardly through the openings and onto the animal. The elongated channel 22 which extends the length of the tube permits the dust in the tube to flow from one end of the tube to the other to ensure that dust will be provided to the dust valves.

When the tube 10 becomes empty, the tube 10 may be thrown away and a new tube 10 installed therein. Thus it can be seen that a novel insecticide applicator has been provided which permits the tube to be shipped from the factory with the dust contained therein so that the dust does not have to be separately shipped and placed in communication with the tube after the tube has been mounted as in the prior art device. The installer of the tube has a minimum of contact with the dust in the tube so that the insecticide dust may be safely handled. Thus it can be seen that the invention accomplishes at least all of its stated objectives.

I claim:
1. A groomer tube, comprising,
an elongated hollow tubular member having first and second ends, a top and a bottom,
first means closing said first end,
second means closing said second end,
a pesticide dust material in said tubular member,
means at one of said first and second ends for mounting said tubular member in an operative position above the ground to permit animals to rub there against,
said tubular member having a plurality of longitudinally spaced-apart transverse annular troughs formed on the interior thereof, to direct the flow of dust material downwardly to a lowermost point in said annular troughs,
said tubular member having a plurality of longitudinally spaced opening formed therein along the bottom thereof,
and a normally closed valve means mounted in each of said openings whereby animal contact therewith will release the pesticide dust material within said tubular member.

2. The tube of claim 1 wherein said tubular member has a longitudinally extending trough means formed therein along its bottom which intersects said annular troughs to permit the pesticide dust material to flow from said first end of said tubular member to said second end through said longitudinal trough means.

3. The tube of claim 1 wherein said openings are formed in said annular troughs.

4. The tube of claim 1 wherein each of said valve means comprises a dumbbell shaped valve member.

5. The tube of claim 1 wherein a plurality of rubbing protrusions extend outwardly from said tubular member.

6. A groomer tube, comprising:
an elongated hollow tubular member having first and second ends,
a top and a bottom,
first means closing said first end,
second means closing said second end,
a pesticide dust material in said tubular member,
means at one of said first and second ends for mounting in said tubular member in an operative position above the ground to permit animals to rub there against,
said tubular member having a plurality of longitudinally spaced-apart transverse annular troughs formed on the interior thereof, to direct the flow of dust material downwardly to a lowermost point in said annular troughs,
said tubular member having a plurality of longitudinally spaced-apart dome-shaped members being adapted to be removed from said tubular members to create openings in said tubular member to create openings in said tubular member to permit valve members to be mounted therein.

* * * * *